(12) United States Patent
Feldstein et al.

(10) Patent No.: US 8,619,950 B1
(45) Date of Patent: Dec. 31, 2013

(54) VIDEO AND DIGITAL AUDIO TRANSPORT

(75) Inventors: George Feldstein, Cresskill, NJ (US);
Mark LaBosco, New City, NY (US);
Krunoslav Estaban Draganovic, Upper Nyack, NY (US); Alexander J. Marra, Hoboken, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 929 days.

(21) Appl. No.: 12/728,381

(22) Filed: Mar. 22, 2010

Related U.S. Application Data

(63) Continuation of application No. 10/707,023, filed on Nov. 14, 2003, now abandoned.

(51) Int. Cl.
*H04M 11/00* (2006.01)

(52) U.S. Cl.
USPC ............... 379/93.01; 379/88.13; 379/93.11; 379/93.08

(58) Field of Classification Search
USPC ........ 379/88.13, 93.11, 93.01, 93.08, 221.07, 379/326
See application file for complete search history.

(56) References Cited

U.S. PATENT DOCUMENTS

| | | | |
|---|---|---|---|
| 7,065,190 B2 * | 6/2006 | Gershfeld | 379/93.01 |
| 2003/0169374 A1 * | 9/2003 | Cole et al. | 348/621 |
| 2003/0201802 A1 * | 10/2003 | Young | 327/108 |

* cited by examiner

*Primary Examiner* — Duc Nguyen
*Assistant Examiner* — Yosef K Laekemariam
(74) *Attorney, Agent, or Firm* — Crestron Electronics Inc.

(57) ABSTRACT

A video and digital audio transport system transports high resolution computer, video, computer video graphics and other video signals, as well as multiple channels of high quality audio, over extended lengths of unshielded twisted pair (UTP) cabling. Frequency compensation techniques are employed to extend the bandwidth of the UTP cables, and differential signaling over the common mode of a first two of the four twisted pairs comprising the UTP cable is used to transmit horizontal sync and differential signaling over the common mode of a second two of the four twisted pairs is used to transmit vertical sync. In addition, a unique digital encoding technique is applied to a standard digital audio encoding protocol to augment the number of available audio channels. A digitally controlled delay line is incorporated to compensate for the different lengths of each twisted pair.

1 Claim, 4 Drawing Sheets

VIDEO AND DIGITAL AUDIO TRANSPORT

CROSS REFERENCE TO RELATED APPLICATIONS

This application is a substitution of U.S. patent Ser. No. 10/707,023 filed Nov. 14, 2003.

STATEMENT REGARDING FEDERALLY SPONSORED RESEARCH OR DEVELOPMENT

Not Applicable

PARTIES TO A JOINT RESEARCH AGREEMENT

Not Applicable

BACKGROUND OF THE INVENTION

1. Technical Field

The present invention relates to an apparatus and method for transmitting audio and video signals over extended lengths of unshielded twisted pair cable.

2. Description of Related Art Including Information Disclosed Under 37 CFR 1.97 & 1.98

The prior art includes various transmission and receiving units for audio and visual signals. The combination of the unique systems of this invention to transport audio and visual signals over unshielded twisted pair cable is not believed to have been disclosed in the prior art.

More specifically, the prior art includes U.S. Pat. No. 7,064,190 to Gershfeld and Pat. Pub. 2003/0201802 to Young. However, both Gershfeld and Young distincty teach against transmitting synchronization signals wherein the first and second synchronization signals act as a differential signal across the common mode of the first and second pairs of the four twisted wire pairs and the common mode of said third and fourth pair of the four twisted pairs, respectfully. For example, Young teaches about a third common mode differential signal, that such a signal is "slower in speed", but still "may be useful for a number of things". Although Young lists specific possible uses for such a differential signal, including handshaking control, flow control, status, and functions not requiring a high-speed data rate; (real time) video synchronization is notably absent from this list.

Furthermore, Young teaches that the common mode differential signal (across two other differential data signals) can be used to transmit data when the "three data signals . . . do not have to be synchronized with each other". In stark contrast, the instant invention requires that both the first and second synchronization signals are tightly synchronized with the associated video information in order to produce an acceptable display.

This need to maintain close synchronization between the synchronization signals (i.e., horizontal and vertical sync) is inherently taught in Gershfeld where the horizontal sync is superimposed onto the green video signal and the vertical sync is superimposed onto the red video signal. On the other hand, the instant invention completely separates the synchronization signals from the associated video content.

Applicants' inventive video transport system comprises a transmit unit adapted to transmit first and second synchronization signals across the common modes of four twisted wire pairs. Synchronization signals by their nature are time sensitive signals. It would not be intuitive to one skilled in the art to transmit such signals on time skewed transmission paths, such as the common mode of twisted pairs.

The unique systems of applicants' invention to transport audio and visual signals over unshielded twisted pair cable is not believed patentable over the known prior art. Furthermore, the invention is not rendered obvious by any combination of multiple references from analogous fields.

SUMMARY OF INVENTION

It is to be understood that both the general and detailed descriptions that follow are exemplary and explanatory only and are not restrictive of the invention.

DISCLOSURE OF INVENTION

According to a first aspect, the present invention provides a system for transporting video signals and digital audio signals over extended lengths of a communication cable having four twisted wire pairs. This video and digital audio transport system includes a transmitter unit which processes input video and audio signals and a receiver unit which receives a first, second, and third video component signals and the digital audio signal from the communication cable. The transmitter unit transmits a first video component signal on a first twisted wire pair, a second video component signal on a second twisted wire pair, a third video component signal on a third twisted wire pair, and a digital audio signal on a fourth twisted wire pair. The transmitter unit transmits a first synchronization signal as a differential across the common mode of first twisted wire pair and the common mode of the second twisted wire pair. The transmitter unit also transmits a second synchronization signal as a differential across the common mode of third twisted wire pair and the common mode of the fourth twisted wire pair. The receiver unit processes the first, second, and third video component signals and the digital audio signal, recovers the first and second synchronization signals, and provides outputs to video and audio devices.

BRIEF DESCRIPTION OF DRAWINGS

The above description illustrates the objects and advantages of the invention and it may be more clearly seen when viewed in conjunction with the accompanying drawings wherein.

LIST OF REFERENCE NUMBERS FOR THE MAJOR ELEMENTS IN THE DRAWING

Figure 1:
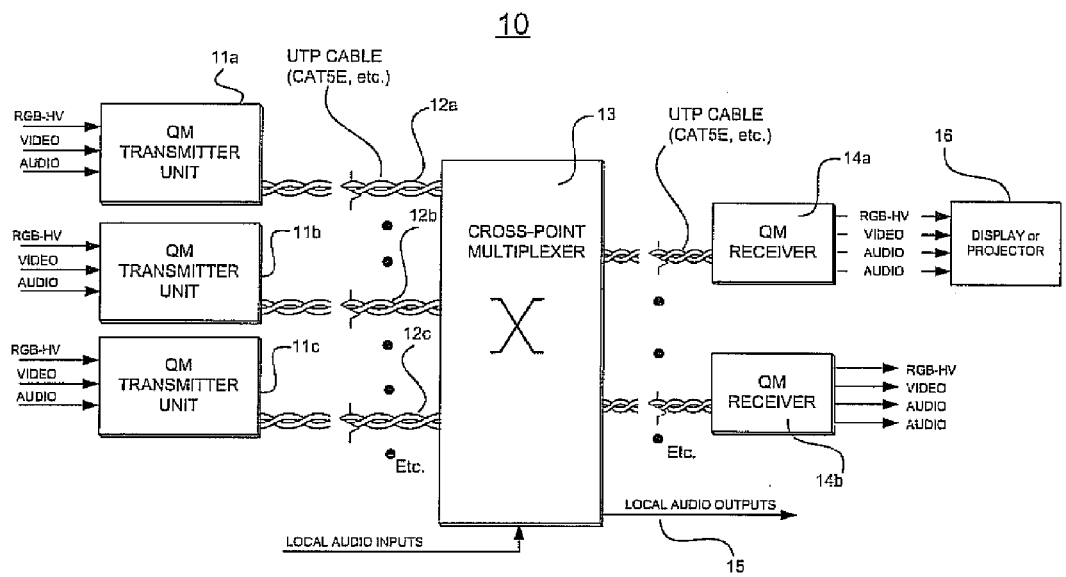
FIG. 1 is a schematic illustration of a video and digital audio transport system in accordance with an illustrative embodiment of the present invention.

The following is a list of the major elements in the drawings in numerical order.

| | |
|---|---|
| 2 | audio decoding module (p/o receiver unit 14a); |
| 10 | video and digital audio transport system; |
| 11a | (first) transmitter unit; |
| 11b | (second) transmitter unit; |
| 11c | (third) transmitter unit; |
| 12a | (first) unshielded twisted pair cable (connected to 11a); |
| 12b | (second) unshielded twisted pair cable (connected to 11b); |
| 12c | (third) unshielded twisted pair cable (connected to 11c); |
| 13 | cross-point switch; |
| 14a | (first) receiver unit; |
| 14b | (second) receiver unit; |
| 15 | local audio outputs (from cross-point switch 13); |
| 16 | video display (driven from first receiver unit 14a); |
| 17 | video selector switch (p/o transmitter unit 11a); |
| 18 | audio selector switch (p/o transmitter unit 11a); |
| 19 | audio encoding module (p/o transmitter unit 11a); |
| 20 | system transmitter module (p/o transmitter unit 11a); |
| 21 | three component video signal; |
| 22 | (other) video signals; |
| 24 | differential receiver module (p/o receiver unit 14a); |
| 26 | video delay compensation line (p/o receiver unit 14a); |
| 27 | video buffers (p/o receiver unit 14a); |
| 29 | audio switch and mixer module (p/o receiver unit 14a); |
| 29 | audio switch and mixer module (p/o receiver unit 14a); |
| 30a | first differential line driver; |
| 30b | second differential line driver; |
| 31a | (first) differential receiver; |
| 31b | (second) differential receiver; |
| 31c | third differential receiver; |
| 32a | (first) termination network; |
| 32b | (second) termination network; |
| 51 | common mode injection point (of first differential line driver 30a); |
| 52 | differential sync driver; |
| 53a | (first) twisted pair (of UTP cable); |
| 53b | (second) twisted pair (of UTP cable); |
| 61 | video input line; |
| 62 | video output line; |
| 63a | (first) binary controlled multiplexer; |
| 63b | (second) binary controlled multiplexer. |

DETAILED DESCRIPTION OF THE INVENTION

Referring to FIG. 1 of the drawings, the invention relates to a video and digital audio transport system 10 for transporting high resolution computer video as well as multiple channels of high quality audio over extended lengths of unshielded twisted pair (UTP) cable having four twisted cable pairs, including for example CAT5E, CAT6, and other types of local area network (LAN) cables. The system 10 comprises one or more transmitter units 11a-c, where each transmitter unit is coupled to an associated media source or computer (not shown). In an example embodiment, these inputs are labeled "RGB", "video", and "audio". Each of the transmitter units 11a-c is suitable for processing input video and audio signals for transmission over the UTP cable.

The output signal, from each of the transmitter units 11a-c, is fed over a corresponding unshielded twisted pair (UTP) cable 12a-c to a cross-point switch 13 which provides an output signal to each of several receiver units 14a-b as well as local audio outputs 15. Most embodiments of the present invention include multiple transmitter units connected to respective inputs of cross-point switch 13 and multiple receiver units connected to respective outputs of cross-point switch 13.

The first receiver unit 14a presents a set of signals to video display 16, which may for example be a video projector. Other receiver units, such as the second receiver unit 14b, perform similar video signal output functions. Each of the receiver units 14a-c is suitable for processing signals received over the UTP cable and providing output video and audio signals to video and audio devices.

Figure 2:
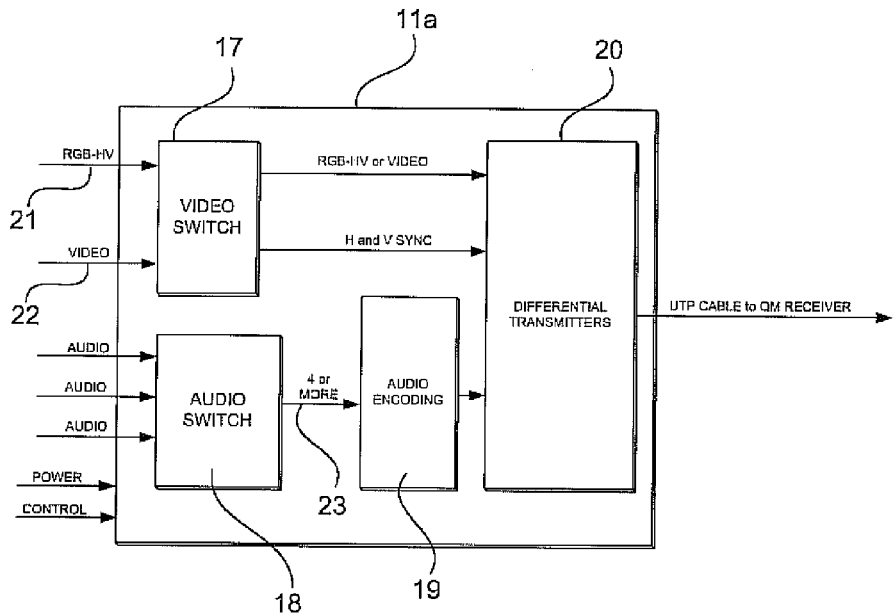
FIG. 2 shows a transmitter unit suitable for processing input video and audio signals for transmission over unshielded twisted pair cable.

FIG. 2 shows further details of a first transmitter unit 11a, in accordance with the present invention. Transmitter unit 11a comprises a high bandwidth video selector switch 17 and an audio selector switch 18. The audio selector switch 18 also incorporates a line level interface. An audio encoding module 19 creates an enhanced form of the industry standard "Sony/Philips Digital Interconnect Format" (SPDIF) format which is modified to include multiple audio channels in accordance with the present invention.

An incoming three component video signal 21, such a 'red', 'green', and 'blue' (RGB) video signal including horizontal (H) and vertical (V) synchronization, and other video signals 22 are fed to the video selector switch 17. The program audio 23 is selected at audio selector switch 18 and then fed to the audio encoding module 19.

The system transmitter module 20 transmits the video component information, such as for example RGB, or brightness, blue-difference, and red-difference (YPbPr), over three (3) of the four (4) twisted pairs of the UTP cable. The digital audio signal is transmitted over the remaining fourth pair of the UTP cable. According to the present invention, each video synchronization signal is transmitted differentially using common mode signaling over two (2) of the four (4) twisted pairs. Thus, four twisted pairs provide two differential pathways to transport both horizontal (H) and vertical (V) synchronization information.

Figure 3:
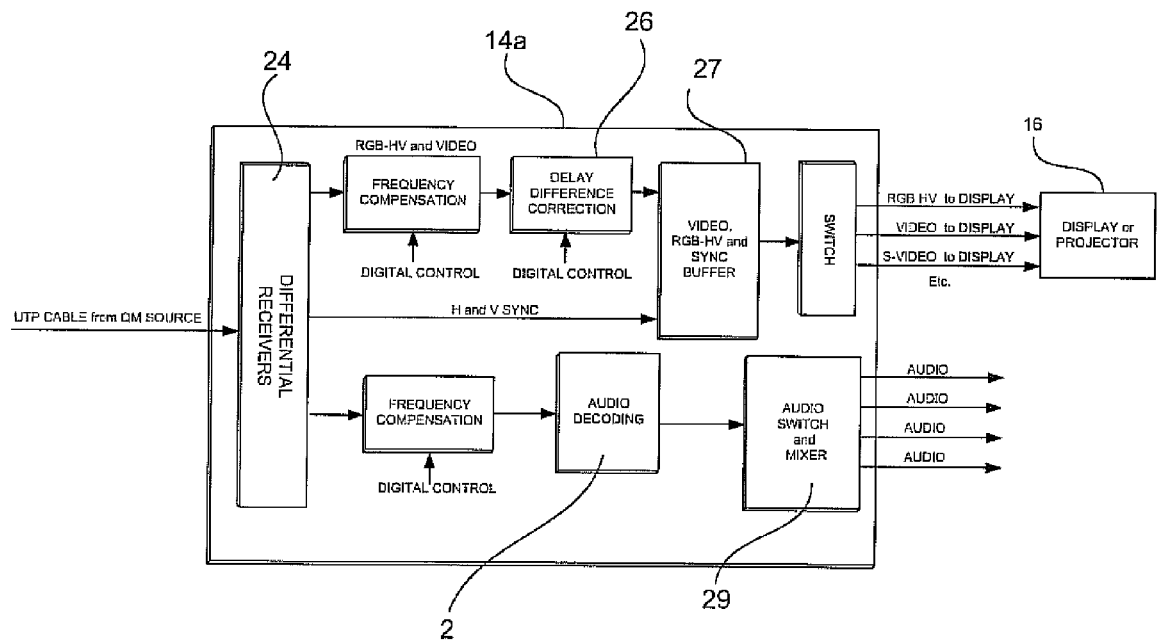
FIG. 3 shows a receiver unit suitable for processing signals received over unshielded twisted pair cable and providing output video and audio signals to video and audio devices.

FIG. 3 shows further details of a first receiver unit 14a, in accordance with the present invention. Receiver unit 14a comprises a differential receiver module 24 which transforms and conditions incoming differential video signals, differential common mode sync signals, and digital audio stream into a set of single-ended signals suitable for decoding and video and audio routing. The receiver unit 14a also comprises a digitally controllable frequency compensation circuit for video/audio signals followed by a high bandwidth video delay compensation line 26 for the video signals and the audio decoding module 2 for the audio. The necessary video buffers 27 are provided to present the video signals to a video display 16. The decoded audio signal is fed to an audio switch and mixer module 29, amplified, and output as audio and speech audio.

In an illustrative embodiment, each receiver unit includes a digital audio processor, a mixer, and an audio amplifier and is designed to combine multiple audio channels into left, right, and speech outputs.

Figure 4:
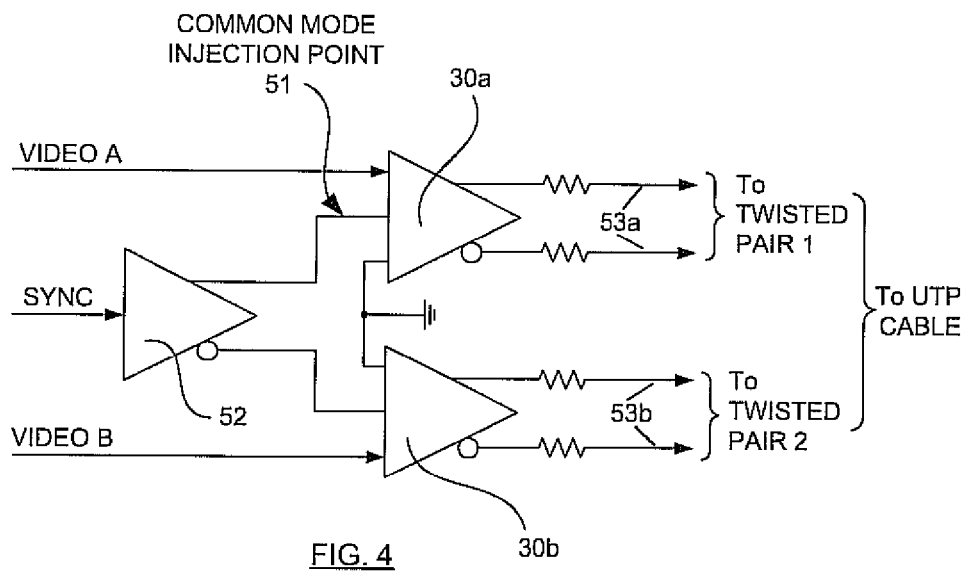
FIG. 4 shows an inventive circuit suitable for the differential encoding of horizontal and vertical sync signals as common mode signals on two (2) of the four (4) twisted pairs within an unshielded twisted pair cable.

The transmission of component video signals in combination with synchronization signals using a differential injection onto the common mode of two of the video (or digital audio) pathways is shown in FIG. 4. As shown, first differential line driver 30a has a common mode injection point 51, and second differential line driver 30b also has a common mode injection point. By applying the two output phases of a differential sync driver 52 to the two differential line drivers 30a and 30b, the sync information is transported over the twisted pairs 53a and 53b to the UTP cable, according to a unique method of present invention.

Figure 5:
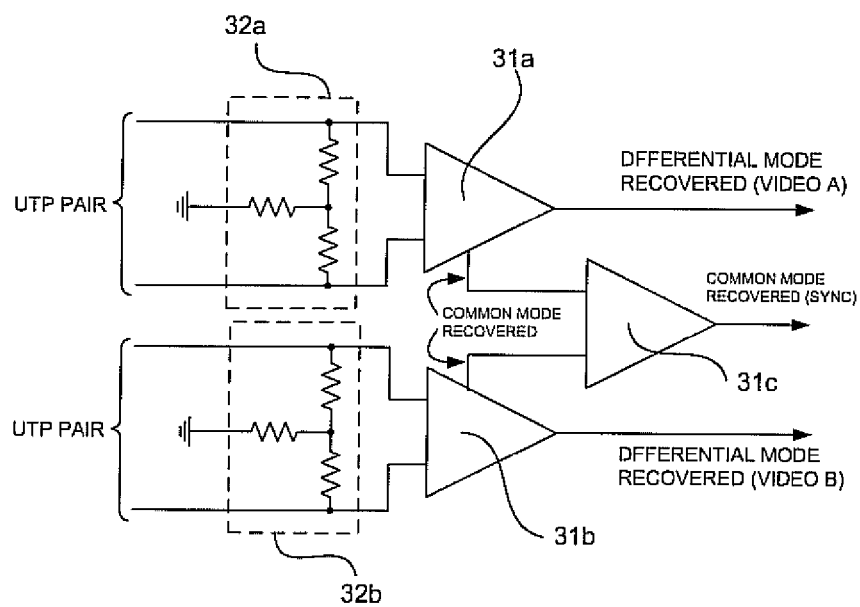
FIG. 5 shows an inventive circuit for decoding the differentially encoded horizontal and vertical sync common mode signals of FIG. 4.

In order to recover the differentially transmitted common mode synchronization signals, the arrangement shown in FIG. 5 is applied. Termination networks 32a, 32b are used to properly terminate the differential twisted pairs as well as establish a specific common mode impedance between them. Differential receivers 31a, 31b provide common mode signal recovery and frequency compensation. A third differential receiver 31c recovers the common mode sync information. In one embodiment, the frequency compensation consists of a digitally controlled multi-pole "peaking" circuit which compensates for the cable attenuation as described in the following equation:

$$\text{Maximum Attenuation Cable}(db/100m) = 0.2 * (1.967*\text{Sqrt}(f) + 0.023*f + 0.05/\text{Sqrt}(f)); \quad \text{EQ. 1}$$

where f is the frequency from 0.772 to 200 MHz. The frequency response shown is typical of CAT 5E cable, manufactured by Belden, Inc.

Figure 6:
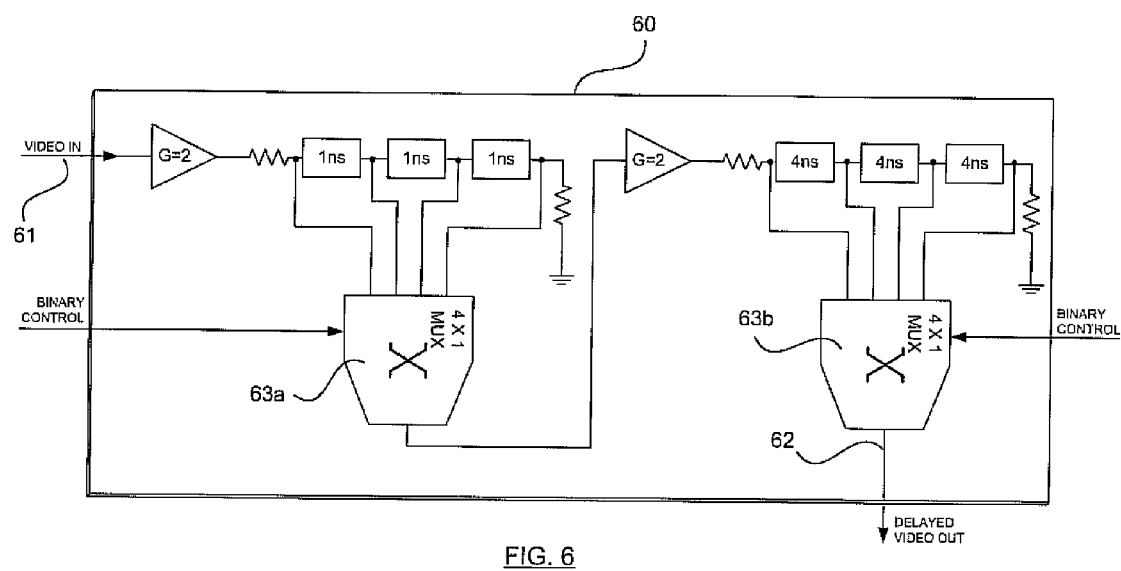
FIG. 6 shows an inventive passive digitally controlled delay compensation line suitable for correcting the timing differences due to unequal electrical lengths of the four (4) twisted pairs within an unshielded twisted pair cable

The present invention corrects timing differences that are due to unequal electrical lengths of the UTP cable using a high bandwidth video delay compensation line 26, as described above. In a preferred embodiment, this high bandwidth video delay compensation line 26 is implemented as a digitally controlled passive delay line circuit. The main features of this digitally controlled delay line circuit are revealed in FIG. 6.

The input video signal on video input line 61 is delayed by a predetermined amount to provide a delayed video signal on video output line 62. The 'delay time' is determined by lumped time constants which are switched in and out of the circuit by the binary controlled multiplexers 63a and 63b. Advantageously, this allows for the present invention to correct the timing differences due to unequal electrical lengths of the twisted pairs of the UTP cable.

In a preferred embodiment, each of the receiver units 14a-b includes a microprocessor that allows the frequency and delay line compensations to be controlled by using pre-calibrated presets, where each of these presets is based on the UTP crosspoint path selected (i.e. from each particular transmitter unit to each particular receiver unit).

The video and digital audio transport system, as shown in FIG. 1, is designed to transmit at least three (3) high quality audio channels across one (1) of the four (4) twisted pairs within the UTP cable. In order to accomplish this, the audio is digitized, preferably at a sampling rate of at least 44 kHz and a sampling resolution of at least 16 bits.

According to the invention, multiple channels of audio are transmitted utilizing Time Division Multiplexing (TDM). As a result, the data rate on the UTP cable is increased in proportion to the number of transmitted audio channels, which include both data and clock information. Those skilled in the art are aware of several line coding techniques that may seem appropriate to accomplish this. For example, SPDIF is an industry standard that uses biphasic coding to send clock and data information and it is desirable to use such a standard format because both transmitters and receivers are readily available.

However, the SPDIF protocol, when used to send normal data, allows for transmission of only two audio channels. Therefore, it was necessary to develop an inventive mechanism to increase the number of audio channels that can be transmitted using a 'SPDIF-like' protocol.

There are two aspects to increasing the number of audio channels that can be transmitted using a SPDIF-like protocol: data rate and framing method. As the number of audio channels increase, the data rate must increase proportionally (i.e. sending more data while preserving the audio sampling rate). Standard SPDIF components are available with data transmission rates of both 96 kHz and 192 KHz. Therefore, we have determined that increasing the data rate only requires the choice of a higher speed standard SPDIF component.

The present invention uses a 'framing' method to indicate where in an SPDIF serial data stream each audio channel starts and ends. In a first embodiment, certain low order audio bits are used to create a framing pattern within the data stream. Advantageously, since these low order bits have very little weight, they can be manipulated to provide framing information with little overall effect on the audio quality.

In a second embodiment, several overhead bits that are offered by the SPDIF protocol are manipulated to generate a framing pattern. One of the SPDIF overhead signals is called the 'user bit'. This user bit is sampled and sent along with every audio sample. In certain embodiments of the present invention, a framing pattern is generated by changing the state of the user bit at the beginning of a frame.

With either embodiment, the SPDIF transmitter and receiver pair will faithfully transport and recreate a usable audio framing pattern at the destination. Once recreated at the destination, the serial data stream can be framed and each channel identified. Accordingly, the present invention allows for the transmission of three (3) or more audio channels across one (1) of the four (4) twisted pairs within a UTP cable

INDUSTRIAL APPLICABILITY

To solve the aforementioned problems, the present invention is a unique system that includes at least one QM transmitter unit which supplies signals over UTP cable or the equivalent to switching means which feed signals to a QM receiver and then to a display device and/or audio device.

LIST OF ACRONYMS USED IN THE DETAILED DESCRIPTION OF THE INVENTION

The following is a list of the acronyms used in the specification in alphabetical order.

| | |
|---|---|
| B | blue (video component) |
| CAT5 | category 5 cable (5th generation of standard Ethernet cabling) |
| CAT5E | category 5E cable (enhanced version of category 5 cable) |
| CAT6 | category 6 cable (6th generation of standard Ethernet cabling) |
| dB | decibel |
| f | frequency |
| G | green (video component) |
| kHz | kilohertz |
| LAN | local area network |
| m | meter |
| MHz | megahertz |
| Pb | blue-difference (B-Y) (video component) |
| Pr | red-difference (R-Y) (video component) |
| QM | Quick Media (Crestron brand name) |
| R | red (video component) |
| SPDIF | Sony/Philips Digital Interconnect Format |
| Sqrt | square root (mathematical function) |
| TDM | time division multiplexing |
| TIA/EIA | Telecommunications Industry Association and the Electronics Industry Association |
| UTP | unshielded twisted pair |
| Y | brightness (video component) |

While the invention has been explained by a detailed description of certain specific embodiments, it is understood that various modifications and substitutions can be made in any of them within the scope of the appended claims, which are intended also to include equivalents of such embodiments.

What is claimed is:

1. A video and digital audio transport system for transporting video signals and digital audio signals over extended lengths of a communication cable having four twisted wire pairs, said system comprising:
   (a) a transmitter unit which processes input video and audio signals, said transmitter unit further comprising;

(i) a first differential driver adapted to transmit a first video component signal on a first one of said four twisted pairs of said communication cable,
(ii) a second differential driver adapted to transmit a second video component signal on a second one of said four twisted pairs of said communication cable,
(iii) a third differential driver adapted to transmit a third video component signal on a third one of said four twisted pairs of said communication cable,
(iv) a fourth differential driver adapted to transmit a digital audio signal on a fourth one of said four twisted pairs of said communication cable,
(v) a fifth differential driver adapted to transmit a first synchronization signal as a differential signal across the common mode of said first one of the four twisted wire pairs and the common mode of said second one of the four twisted wire pairs, and
(vi) a sixth differential driver adapted to transmit a second synchronization signal as a differential signal across the common mode of said third one of the four twisted wire pairs and the common mode of said fourth one of the four twisted wire pairs;
(b) a receiver unit which receives the first, second, and third video component signals and the digital audio signal from the communication cable, said receiver unit further comprising
(i) a digitally controllable high bandwidth passive delay compensation line for equalizing the transmission delays of the first, second, and third video component signals,
(ii) a microprocessor adapted to digitally control said delay compensation line in accordance with a plurality of pre-calibrated presets,
(iii) a first termination network and a corresponding first differential receiver connected to the first one of said four twisted wire pairs of said communication cable,
(iv) a second termination network and a corresponding second differential receiver connected to the second one of said four twisted wire pairs of said communication cable,
(v) a third termination network and a corresponding third differential receiver connected to the third one of said four twisted wire pairs of said communication cable,
(vi) a fourth termination network and a corresponding fourth differential receiver connected to the fourth one of said four twisted wire pairs of said communication cable,
(v) a fifth differential receiver connected across the common mode outputs of said first and second differential receivers, and being adapted to
(A) recover the differential mode signal representing the corresponding first synchronization signal, and
(viii) a sixth differential receiver connected across the common mode outputs of said third and fourth differential receivers, and being adapted to
(A) recover a differential mode signal representing the corresponding second synchronization signal;
(c) a cross-point switch having a plurality of inputs and a plurality of outputs, wherein
(i) each one of said plurality of inputs is configured to accept inputs from a corresponding transmitter unit; and
(ii) each one of said plurality of outputs is configured to provide outputs to a corresponding receiver unit; and
(d) wherein each of said plurality of pre-calibrated presets has a value determined by a particular cross-point path being selected.

* * * * *